United States Patent [19]

Markham

[11] Patent Number: 5,150,108
[45] Date of Patent: Sep. 22, 1992

[54] METHOD FOR SLANTING A GENERIC FONT FORMAT WHILE INSERTING CORRECTIVE PIXELS TO IMPROVE PRINT QUALITY

[75] Inventor: Roger Markham, Webster, N.Y.

[73] Assignee: Xerox Corporation, Stamford, Conn.

[21] Appl. No.: 789,635

[22] Filed: Nov. 12, 1991

Related U.S. Application Data

[63] Continuation of Ser. No. 457,498, Dec. 27, 1989, abandoned.

[51] Int. Cl.$^5$ .............................................. G09G 1/06
[52] U.S. Cl. .................................... 340/735; 340/728; 340/731; 340/748; 400/121
[58] Field of Search ............... 240/728, 731, 735, 748; 240/790, 727; 400/121

[56] References Cited

U.S. PATENT DOCUMENTS

| | | | |
|---|---|---|---|
| 3,803,583 | 4/1974 | Manber | 340/735 |
| 4,079,367 | 3/1978 | Yonegawa et al. | 340/728 |
| 4,129,860 | 12/1978 | Yonegawa et al. | 340/728 |
| 4,242,678 | 12/1980 | Somerville | 340/728 |
| 4,594,674 | 6/1986 | Boulia et al. | 364/523 |
| 4,679,039 | 7/1987 | Neil et al. | 340/728 |
| 4,703,323 | 10/1987 | Troupes et al. | 340/735 |
| 4,712,102 | 12/1987 | Troupes et al. | 340/735 |
| 4,745,561 | 5/1988 | Hirosawa et al. | 340/735 |
| 4,808,985 | 2/1989 | Tanuma et al. | 340/735 |
| 4,837,562 | 6/1989 | Nishiura et al. | 340/728 |
| 4,851,825 | 7/1989 | Naiman | 340/735 |

OTHER PUBLICATIONS

R. S. Colby, IBM Technical Disclosure Bulletin, Feb. 1985, vol. 27 No. 99 "Improvement of Digital Typeface Printing".

Primary Examiner—Jeffery A. Brier
Assistant Examiner—Regina Liang
Attorney, Agent, or Firm—Oliff & Berridge

[57] ABSTRACT

A method of italicizing a font includes the steps of slanting a symbol stored in a generic font format as an arrangement of pixel locations by offsetting the arrangement of pixel locations at a predetermined slope to create a staircase edge; and inserting additional pixels at predetermined locations by a predetermined transformation of the generic font format to conceal the staircase. The method does not require the storage of additional pixel information relating to the symbol. In addition, the predetermined transformation eliminates complex pixel positioning programming requiring an analysis of the symbol pattern and recognition of the location in the pattern where a staircase concealing pixel should be located.

5 Claims, 7 Drawing Sheets

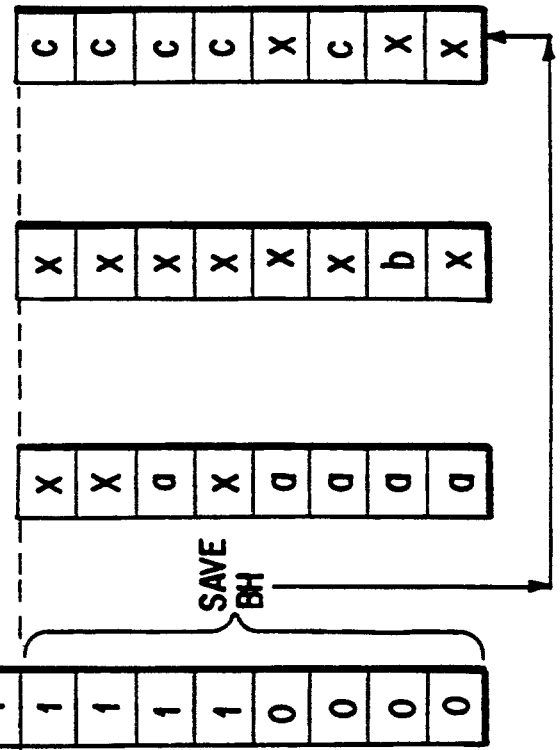
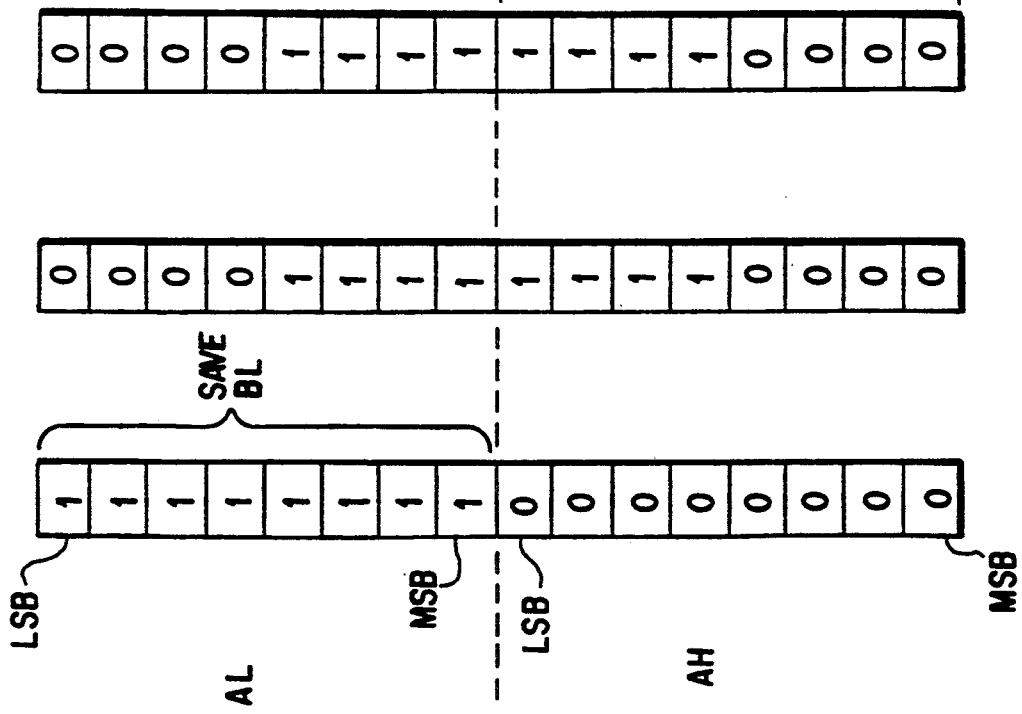

FIG. 4

```
1264: ;
1265: ;PUT WITH ITLAIC FONT FACE
1266: ;CL   SHIFT COUNT
1267: ;CH   BYTES/STROKE LOOP CONTROL
1268: ;DL   STROKE LOOP CONTROL
1269: ;DH   BYTES/STROKE STORAGE
1270: ;BP   DI ADVANCE CONTROL FOR EACH STROKE
1271: ;BL   PREVIOUS BYTE
1272: ;BH   LOW NIBBLE STORAGE
1273: PUT4:       MOV DS,WORD PTR FONT_PTR+2
1274:        MOV BP,DI
1275: PUT4A:      MOV CH,DH
1276:        MOV DI,BP
1277:        SUB BL,BL
1278: PUT4B:      LODSB
1279:        MOV AH,BL
1280:        MOV BL,AL
1281:        SHL AX,CL
1282:        MOV BH,AH
1283:        AND AH,0F4H
1284:        OR ES:[DI],AH
1285:        AND AH,40H
1286:        OR ES:[DI-FIL_HGHT],AH
1287:        AND BH,2FH
1288:        OR ES:[DI+FIL_HGHT],BH
1289:        ADD DI,2*FIL_HGHT+1
1290:        DEC CH
1291:        JNE PUT4B
1292:        MOV BH,AL
1293:        AND AL,0F4H
1294:        OR ES:[DI],AL
1295:        AND AL,40H
1296:        OR ES:[DI-FIL_HGHT],AL
1297:        AND BH,2FH
1298:        OR ES:[DI+FIL_HGHT],BH
1299:        ADD BP,FIL_HGHT
1300:        DEC DL
1301:        JNE PUT4A
1302:        ADD DI,2*FIL_HGHT
1303:        JMP PUTX
1304: ;
```

LEAST SIGNIFICANT BIT

MOST SIGNIFICANT BIT

METHOD FOR SLANTING A GENERIC FONT FORMAT WHILE INSERTING CORRECTIVE PIXELS TO IMPROVE PRINT QUALITY

This is a continuation of application Ser. No. 07/457,498 filed Dec. 27, 1989 now abandoned.

BACKGROUND AND SUMMARY OF THE INVENTION

1. Field of the Invention

The invention relates to a method of transforming a stored symbol into an "italic" symbol having improved print quality. More specifically, the invention relates to a method for slanting a generic symbol and automatically inserting corrective pixels in a predetermined transformation of the generic symbol without expending memory space for storage of the corrective pixels.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

2. Description of Related Art

It is desirable to manufacture a printer which provides high quality text and graphics and moderate speed at a low cost. One factor increasing the cost of printers is the expense of storing many bits of font data, especially at resolutions needed for quality printing. Accordingly, a printer could be provided with sufficient font storage for storing a font in several different forms such as generic, italic or bold form to provide quality printing, but such a printer would be relatively expensive due to increased font storage needs. If sufficient processing power is available, the font storage needs can be reduced by storing one font in its generic form and altering it in as many ways as needed. Such alterations are usually restricted to slight modifications, such as bolding, compressing and expanding.

To "italicize" a font, it is possible to alter the generic font format (FIG. 1A) by sloping the vertical pixels and leaving the horizontal pixels displaced but still horizontal. Typically, the slope is a horizontal displacement (or rightward displacement in FIG. 1A) of one pixel for a vertical rise of four pixels (FIG. 1B). This slope, however, leads to a staircase edge which reduces print quality at 300 spots per inch (spi). A font designer would partially hide the steps of the staircase edge by tediously adding pixels (such as "a", "b" and "c" in FIG. 1C) near the steps, but this insertion of step concealing pixels increases font storage and decreases printer speed due to relatively complex pixel placement programming requiring time consuming decisional steps to determine where to insert the step-concealing pixels. This counteracts any advantages obtained by a decrease in font storage and an increase in print quality due to the use of the font transformation. It is believed that the Hewlett-Packard Desk-Jet Plus has italic capability by font transformation but does not add the additional step concealing pixels.

It is thus an object of the invention to provide a method of "italicizing" a font which obviates the foregoing disadvantages.

It is a further object of the invention to provide a method for "italicizing" a font using a font transformation that automatically inserts step-concealing pixels in a predetermined transformation without substantially increasing font storage or decreasing printer speed.

It is another object of the invention to provide a method for "italicizing" a font by inserting step concealing pixels without storing the step-concealing pixels.

These and other objects and advantages are obtained by the inventive method for "italicizing" a font which includes the steps of slanting a symbol stored in a generic font format as an arrangement of pixel locations by offsetting the arrangement of pixel locations at a predetermined slope to create a staircase edge, and inserting additional pixels at predetermined locations by a predetermined transformation of the generic font format to conceal the staircase. The insertion of the staircase concealing pixels is automatic in that it is performed by the predetermined transformation. Thus, the inventive method eliminates complex pixel positioning programming that requires an analysis of the slanted pattern and a decisional process for recognizing whether a corrective pixel should be inserted at portions of the pattern. The predetermined transformation also does not substantially decrease the speed of the printing process. In addition, the inventive method does not require the storage of additional pixel information relating to the symbol. Thus, the inventive process decreases the cost of a high quality printer by not consuming more storage than necessary for storing the symbol in the generic form.

BRIEF DESCRIPTION OF THE DRAWINGS

The invention will be described with reference to the attached drawings wherein:

FIGS. 2A-2H illustrate the processing steps of the invention operating on certain bytes of font storage to transform a generic font to a slanted font with step-concealing pixels;

FIG. 4 is a table illustrating a copyrighted computer code for carrying out a preferred embodiment of the invention;

DETAILED DESCRIPTION OF THE PREFERRED EMBODIMENT

Figure 1A:
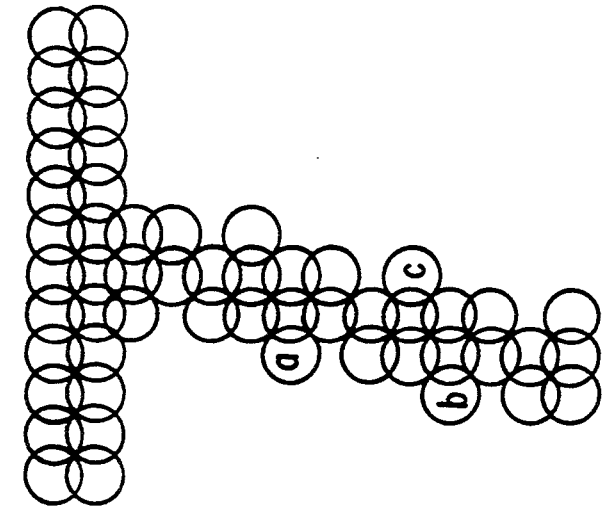
FIGS. 1A, 1B and 1C illustrate a symbol stored as a generic font, a slanted font, and a slanted font with step concealing pixels, respectively.
Figure 1B:
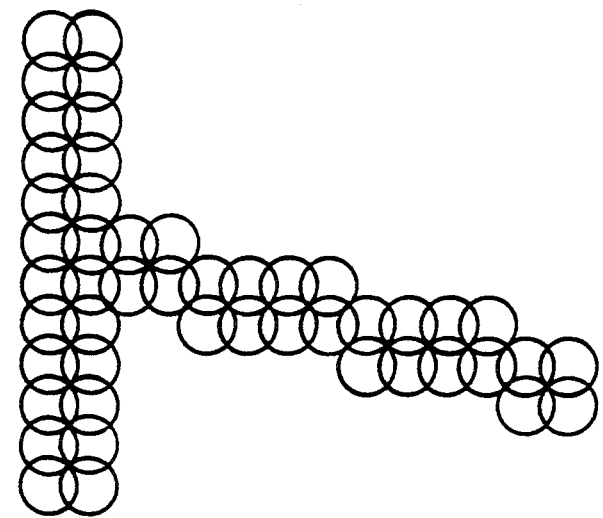
Figure 1C:
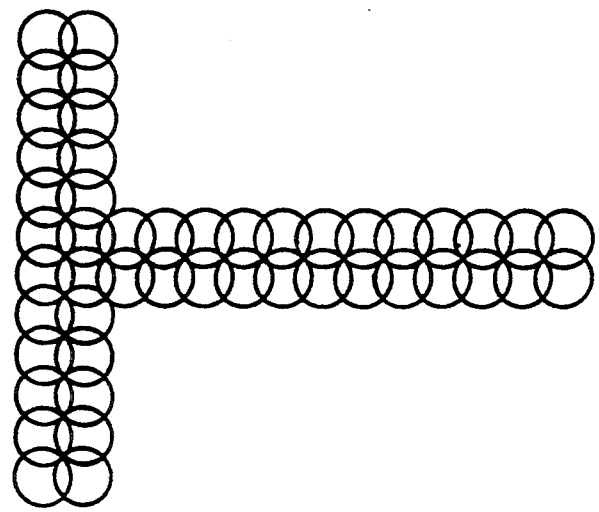
Figure 2B:
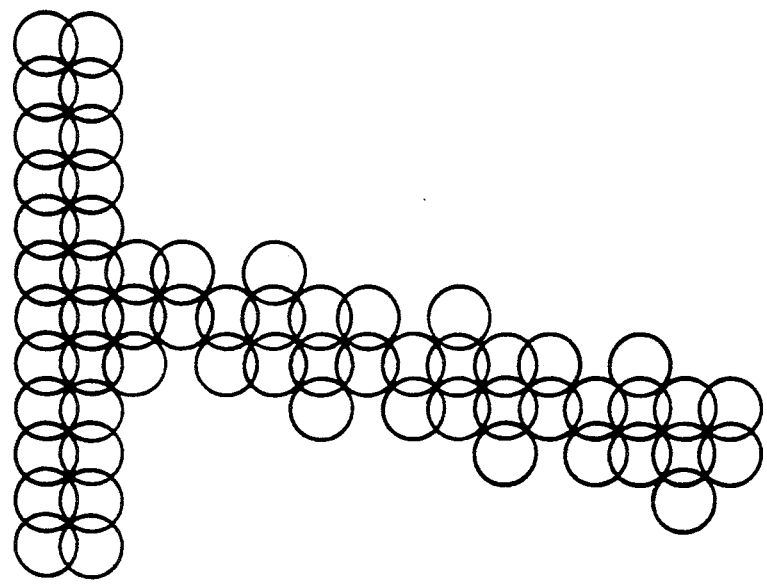

The invention will be described in terms of "italicizing" a symbol, such as a letter, number or other printed character. By "italicizing", it is meant that the generic form of a symbol (stored in a font as a collection of pixels) is altered by: 1) sloping the vertical pixels and leaving the horizontal pixel displaced but still horizontal; and 2) automatically inserting step-concealing pixels. The slope is preferably a rightward or positive displacement of one pixel for a vertical rise of four pixels, but other slopes are possible. Further, the invention will be described with reference to altering the generic form of the upright capital letter "T" as illustrated in FIG. 2A to the italic form of FIG. 2B, but the invention is equally applicable to other symbols and other non-upright generic forms.

Figure 6A:
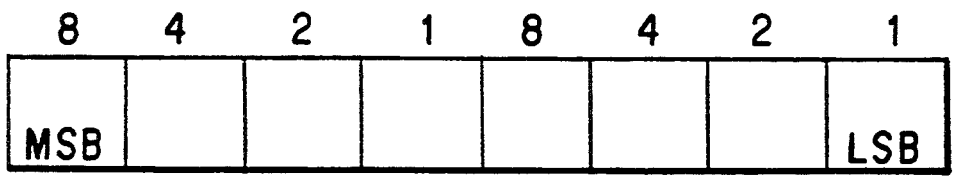
FIGS. 6A-6C illustrate a byte value expressed in a hexadecimal system.
Figure 6B:
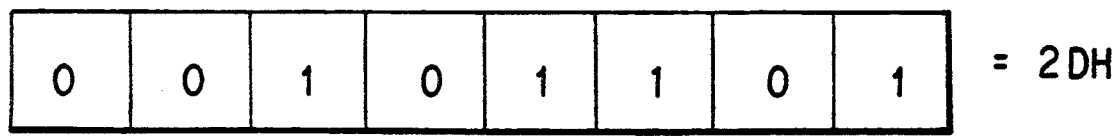
Figure 6C:
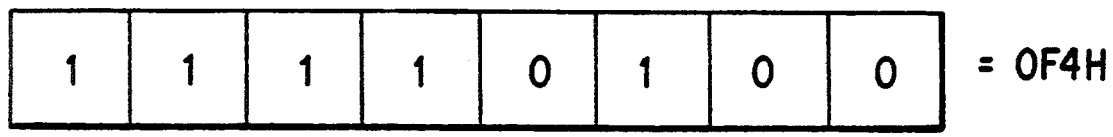

In addition, the invention is described with reference to hexadecimal values known to those skilled in the art. Briefly, the hexadecimal system is a code for evaluating an 8 bit byte when the most significant bit and least significant bit are designated. For example, FIG. 6A illustrates an 8 bit byte with the left-most bit being most significant bit MSB, and the right most bit being the significant bit LSB. Each bit represents the decimal value above the corresponding bit. Values of 10-15 are represented by A-F: A(10), B(11), C(12), D(13), E(14) and F(15). If the bits are marked as in FIG. 6B, the value of the four most significant bits is 2 and the value of the least significant bits is 13 (8+4+1), which are represented in hexadecimal code as 2DH where 2 represents the decimal value of the four most significant bits, D represents the decimal value of 13 for the sum of the four least significant bits, and H represents the notation for the hexadecimal code. If the value of the most significant bits exceeds 9, it is also represented by one of the letters A-F, and the letter is preceeded by a zero, e.g., OF4H meaning the value of the most significant bits is 15 (8+4+2+1) and the value of the least significant bits is 4, as illustrated in the byte of FIG. 6C.

The invention will now be described with reference to the illustrations of FIGS. 2A-H and 3, in conjunction with the copyrighted code fragment of FIG. 4 which is written in 80186 assembly language (Intel microprocessor). The invention, however, can be expressed in other code formats without departing from the invention.

Figure 2A:
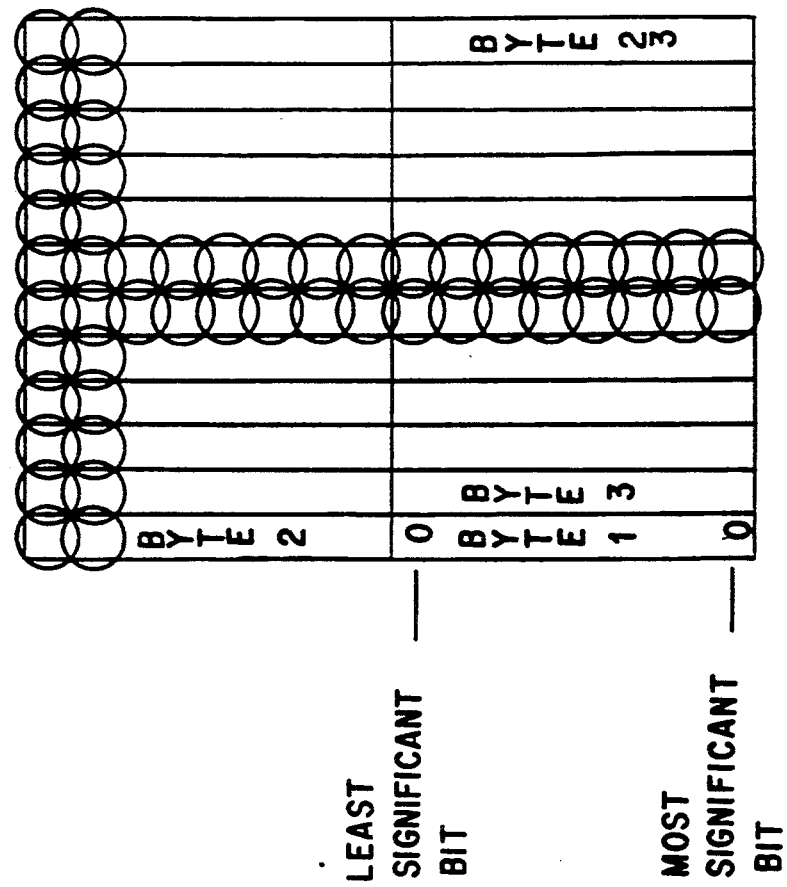

In FIG. 2A, the capital letter "T" is stored in a bounding box which is the font storage for that particular symbol. The bounding box for this symbol includes 24 bytes, each byte containing eight bits. The bounding box defines a bit map which designates the most significant bit and the least significant bit of each byte. Certain of the bits in the bounding box are marked to represent a pixel. The collection of all marked bits represents the symbol stored in the bounding box.

Figure 5A:
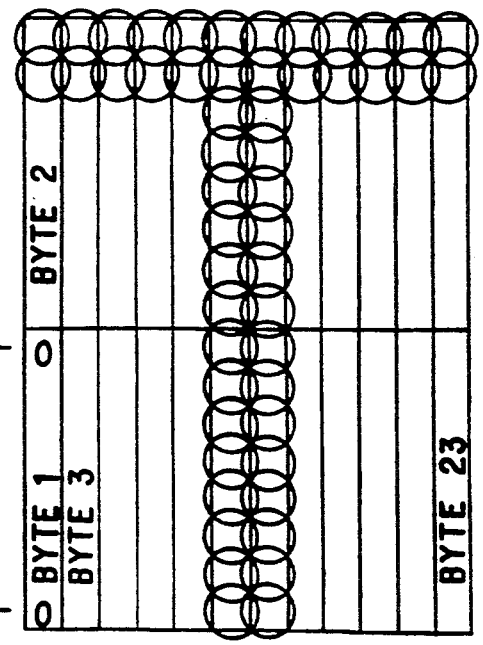
FIGS. 5A and 5B illustrate alignment of a bounding box in font storage (FIG. 5A) with an output page storage (FIG. 5B)
Figure 5B:
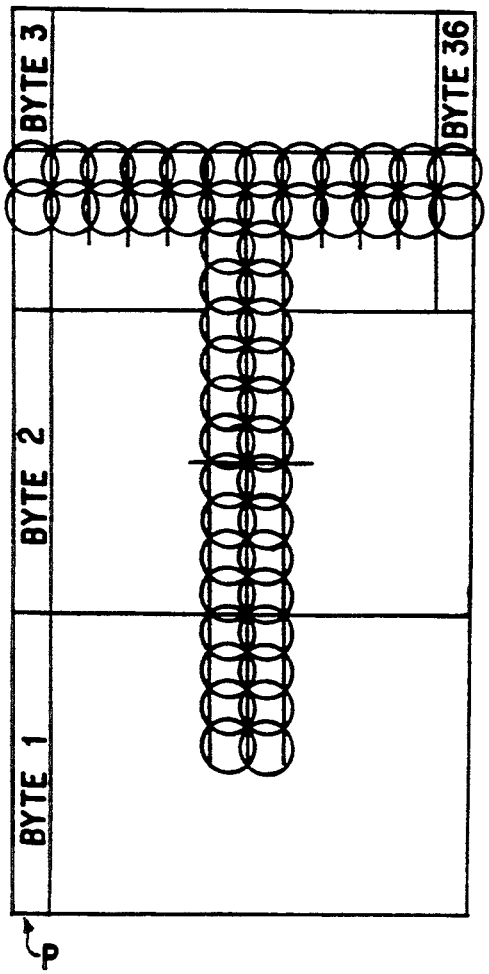

Each byte of the bounding box is examined in an iterative process described below:

1. In FIG. 2A, the vertical leg of the capital letter T ends at the byte boundary or base line. However, other symbols may have a descender, which is a portion of a symbol descending below the base line, for example, the lower case letters "g" or "p". Accordingly, the first step is a non-slanting transformation to adjust an output memory pointer in the storage for the output page to compensate for the slant which is to be introduced and vertical position of the particular symbol. In FIG. 5B (which illustrates the output page image storage next to the bounding box of FIG. 2A), the output memory pointer is illustrated with arrow P to inform the process of the destination of the first byte in the bounding box on which the process starts, i.e., the pointer informs the process of where it started.

2. The position of the output memory pointer is saved (see step 1274 of FIG. 4).

3. Since each byte of the bounding box is examined in an iterative or looping process, the controls for the process must be restarted as the process enters the loop. Accordingly, the third step entails restorage of the output memory pointer and loop control register (steps 1275 and 1276 in FIG. 4).

4. As illustrated in FIG. 2C, the process obtains a current byte from the font storage of FIG. 2A (step 1278 in FIG. 4) and forms a word (step 1279 in FIG. 4) by placing it in the low end register AL of a two byte register AX next to the previous font byte (from the previous cycle through the loop) in the high end register AH of the AX register. The previous font byte had been stored in the low end register BL of a last byte register BX. The current font byte is saved (step 1280 in FIG. 4) in the now available low end register BL.

5. The boundary byte of the font storage may not coincide with the boundary byte in the page image storage. For example, FIG. 5A illustrates the bounding box of FIG. 2A next to a page image storage of FIG. 5B. The page image storage normally includes more bytes than the bounding box. As illustrated, the letter T in page image storage crosses a byte boundary. For an eight bit byte, there is only a one in eight chance that the symbol will end at a byte boundary in the page image storage To align the symbol on the page image storage, the process shifts the word as illustrated in FIG. 2D as necessary to generate the vertical position of the font (step 1281 in FIG. 4). The result of the shift is illustrated in FIG. 2E. The high byte is saved for later operations (step 1282 in FIG. 4) in the high end register BH of the last byte register BX.

6. To provide a step concealing pixel while forming the pixel array for the symbol to be outputted, the shifted byte in the high end register AH of the AX register is masked as illustrated in FIG. 2F to keep only the four most significant bits and the third least significant bit (step 1283 in FIG. 4). In terms of the hexadecimal system, the high end register AH is masked with OF4H (refer to FIG. 6C) which results in the first, second and fourth least significant bits being blocked so as not to represent a pixel. The four most significant bits and the third least significant bit represent the pixels "a". The masked bits of FIG. 2F are then placed into output (FIG. 3) at the position of the current output memory pointer shown by arrow P in FIG. 3 (step 1284 in FIG. 4).

7. The high end register AH of the register AX is then masked again in FIG. 2G to keep the second most significant bit (step 1285 in FIG. 4). In hexadecimal terms, the byte AH is masked with 40H so that only the second most significant bit represents a pixel "b" and the remaining bits are blocked. The masked byte of FIG. 2G is then placed in output (FIG. 3) one stroke back from the position of the current memory pointer P (step 1286 in FIG. 4).

8. The high end register BH of the byte saved in the last byte register BX is then masked as in FIGS. 2H to keep the third most significant bit and the four least significant bits (see step 1287 in FIG. 4). In hexadecimal terms, the high end register BH of the last byte register BX is masked with 2FH so that the third most significant bit and the four least significant bits represent the pixels "c" and the remaining bits are blocked. The masked byte of FIG. 2H is then placed in output (FIG. 3) at the next stroke to the right of the output memory pointer P (step 1288 of FIG. 14).

It is noted that steps 6, 7 and 8 automatically insert the step concealing pixels "a", "b" and "c" at the appropriate predetermined locations of the symbol while simultaneously performing the operations for slanting the symbol. The insertion of the step concealing pixels is accomplished without expending font storage for the step concealing pixels, since the bytes existing for the generic font are masked to obtain the step—concealing pixels. That is, the process consumes no more storage space than that necessary to store the generic form of the symbol. The process also is accomplished relatively quickly since the process does not require any decisional steps to determine where the pixel should be located. That is, the process does not employ time-consuming steps which require recognition of the pattern or a decision regarding the need for additional pixels in the pattern.

Figure 3:
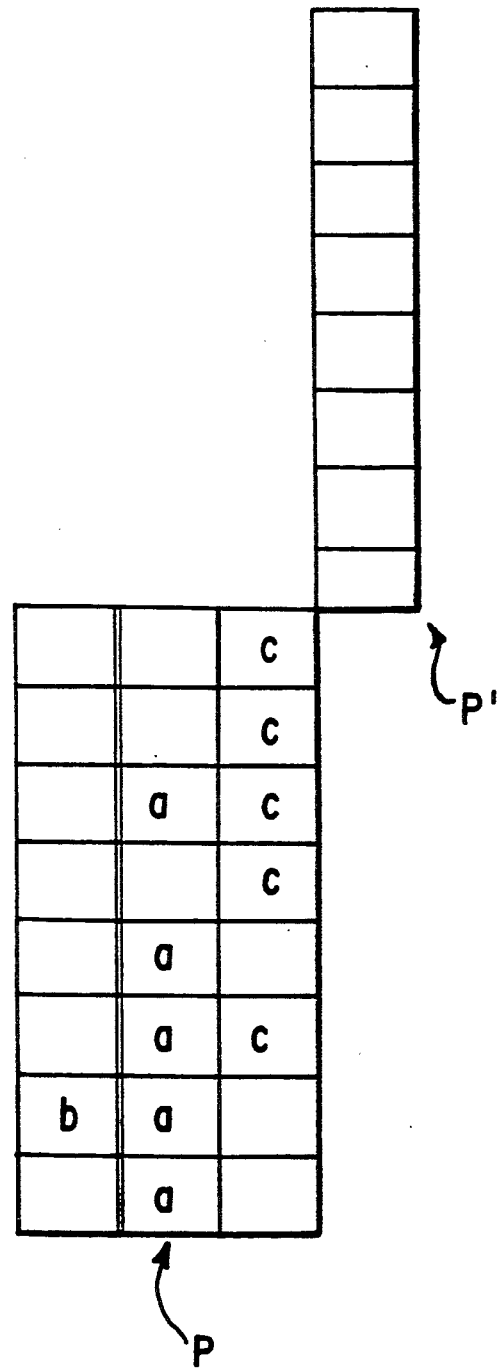
FIG. 3 illustrates the output of the font transformation of the bytes illustrated in FIGS. 2A-2H.

9. The output memory pointer P in FIG. 3 is then advanced two strokes and one byte (step 1289 in FIG. 4), to the position of arrow P' in FIG. 3, in preparation for the operations on the next byte.

10. The process then returns (step 1290 in FIG. 4) to step 4 outlined above (i.e., steps 1278–1280 in FIG. 4) and continues the process until the font stroke is exhausted (step 1291 in FIG. 4).

11. The operations of steps 6, 7 and 8 are then repeated on the as yet unused byte in the low end register AL of the register AX illustrated in FIG. 2E (steps 1292–1298 in FIG. 4), after the shift of step 5 (i.e., steps 1281–1282 of FIG. 4).

12. The saved memory pointer is then advanced to the next stroke (step 1299 in FIG. 4) and the process loops back to step 3 (i.e., steps 1275–1276 in FIG. 4) until there are no more font strokes (steps 1300–1301 in FIG. 4). The output memory pointer is then advanced to indicate the maximum region filled, and the process then exits (steps 1302–1303 in FIG. 4).

The invention has been described with reference to the preferred embodiments thereof, which are intended to be illustrative and not limiting. Variations and changes may be made without departing from the spirit and scope of the invention as set forth in the following claims.

What is claimed is:

1. A method for slanting an unslanted symbol of a font, wherein the font has a predetermined generic font format and comprises a plurality of unslanted symbols, each unslanted symbol defined according to the generic font format as an arrangement of designated pixel locations, comprising the steps of:

defining each of the plurality of unslanted symbols as a first grouping of possible pixel locations containing all of the designated pixel locations;

dividing the first grouping of possible pixel locations of the unslanted symbol into a plurality of second groupings of possible pixel locations;

storing the first grouping of pixel locations of the unslanted symbol in a first set of memory locations;

copying the first grouping of pixel locations of the unslanted symbol to be slanted stored in the first set of memory locations to a second set of memory locations;

simultaneously slanting the unslanted symbol stored in the second set of memory locations to create a staircase edge on the unslanted symbol to form a slanted symbol and designating additional pixels at predetermined pixel locations in the slanted symbol to conceal the staircase edge without storage of additional pixel information relating to the symbol, by masking each of the second groupings of the unslanted symbol with a predetermined pattern of designated pixel locations; and storing the plurality of masked second groupings in the second set of memory locations.

2. The method of claim 1, wherein the generic font format is an upright symbol.

3. The method of claim 1, wherein the predetermined staircase edges formed by a horizontal displacement of one pixel for a vertical rise of four pixels.

4. The method of claim 1, wherein the symbol is stored in a font storage including a plurality of bytes, each byte containing an array of bits ranging between a most significant bit to a least significant bit, a collection of bits each being designated such that the collection of all designated bits represents the symbol in the font storage; and wherein the simultaneous steps of slanting and inserting additional pixels at the predetermined locations by the predetermined transformation includes the step of masking each byte in the font storage to alter the collection of marked bits in a predetermined manner to designate staircase edge concealing pixels at the predetermined locations.

5. The method of claim 1, wherein each second grouping is a byte comprising a linear array of 8 bits, each bit representing a possible pixel location.

* * * * *